A. ZIMMERMANN.
MICROMETER.
APPLICATION FILED JULY 21, 1917.

1,288,788.

Patented Dec. 24, 1918.

Inventor:
Alfred Zimmermann
By Henry Ott Jr.
Atty

UNITED STATES PATENT OFFICE.

ALFRED ZIMMERMANN, OF ZURICH, SWITZERLAND.

MICROMETER.

1,288,788.  Specification of Letters Patent.  Patented Dec. 24, 1918.

Application filed July 21, 1917.  Serial No. 181,993.

*To all whom it may concern:*

Be it known that I, ALFRED ZIMMERMANN, a citizen of the Republic of Switzerland, residing at Zurich, Switzerland, have invented certain new and useful Improvements in Micrometers; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My improvement relates to micrometers for gaging the dimensions of work-pieces within predetermined limits.

With this object in view, I have designed a micrometer with an allowance-measuring-device, consisting of adjustable shutters or slides, the object of which is best illustrated by an example as follows:

Assume the dimension of a work-piece to be 10.37 mm. as a maximum and 10.30 mm. as a minimum. Then I first adjust the micrometer by means of a latch and a clutch so that its measuring limits are situated between 10.25 mm. and 10.70 mm., one revolution of the measuring shaft being equal to 0.50 mm. Hereafter I adjust the shutters on the measuring thimble, to correspond to the extreme figures or limits, *i. e.*, 10.30 mm. and 10.37 mm. respectively. For this purpose I cover by means of one shutter the part situated below the index-line or mark 30 and by means of another shutter that part situated above the index-line or mark 37. The limits between which the work-piece should be, *i. e.* between 30 and 37, remain uncovered. When measuring, I now have to watch the position of this part, with respect to the zero-line on the shaft. The marks or lines on the shaft and the marks or lines on the thimble-scale require no more attention and any mistake, caused by forgetting the correct dimension is excluded.

Figure 5:
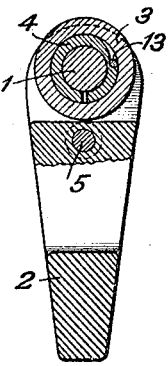
Figure 3:
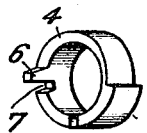
Figure 4:
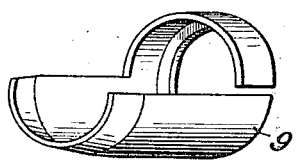
Figure 6:
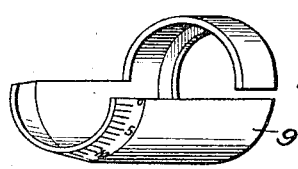

In the drawing I show the micrometer forming the object of my invention. In this drawing Figure 1 is a screw-micrometer with a device for measuring allowances, Fig. 2 is a section through the mechanism for limiting the stroke of the measuring screw, Fig. 3 is a view of a detail of the clutch, and Fig. 4 is a view of the slide or shutter, Fig. 5 is a section on the line I—II of Fig. 2, Fig. 6 shows a variation of the detail shown in Fig. 4.

Figure 1:
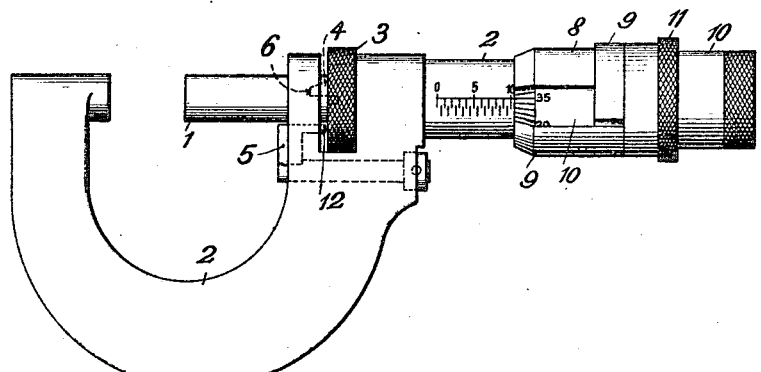
Figure 2:
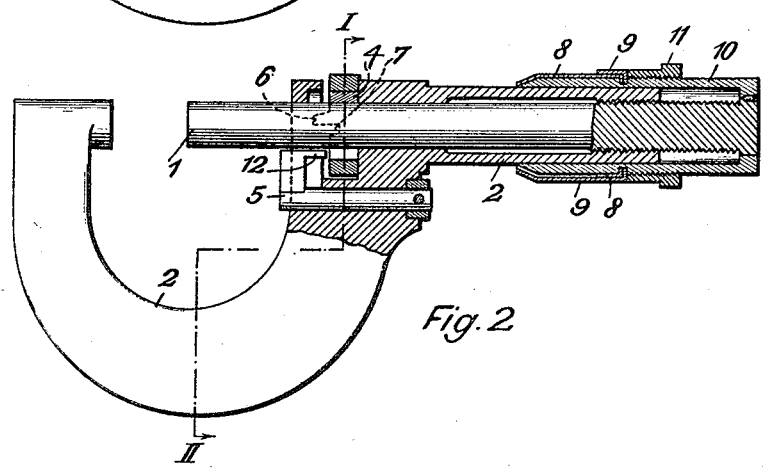

Referring to the drawing, 1 is the measuring screw located in a frame 2, in which are arranged the clamping ring 3, the split clutch 4 and the latch 5 (Figs. 1 and 2). The clutch 4, Fig. 3, is provided with a lug 6 and a notch 7, into which fits a lug 12 of the latch 5, so as to allow of locking the clutch. Said latch 5 can only be withdrawn until the notch is free; therefore the said clutch 4 can not turn completely around, as its lug 6 strikes against the lug 12 of the latch 5.

When the clutch 4 is coupled with the measuring screw 1 by turning the clamping ring 3 which coacts with the clutch by means of a roller or ball 13 in a known manner, this measuring screw can only make about $\frac{9}{10}$ of a full revolution, *i. e.*, the circumference of the clutch 4 diminished by the breadths of the two lugs 6 and 12, so that the measuring can be limited between 10.25 and 10.70 mm.

Slides or shutters 8 and 9 are arranged on a thimble 10; these shutters partly cover the fine scale on the beveled edge of the thimble and serve as limiting marks. By means of a nut 11 said shutters are maintained in a predetermined position (Fig. 2).

These shutters can be provided with scales (Fig. 6), so as to allow of an immediate reading, showing how much the work-piece is larger or smaller than the admissible allowance-size.

If the slides 8 and 9 are removed from the thimble with the fine scale and the clutch 4 is clamped by the latch 5 by pushing said latch with its lug 12 into the notch 7, the micrometer can be used as an ordinary screw-micrometer of known construction.

What I claim is:

1. In a micrometer having a frame and a measuring screw rotatable in said frame and an allowance part fixed on said measuring screw and means independent of said allowance part for preventing the measuring screw from making a complete revolution.

2. In a micrometer having a measuring screw and an allowance-part adjustable by a shutter, a clutch provided with a lug and a notch, a latch engaging said lug, so as to prevent said clutch from making a complete revolution, whereby the measuring screw is locked together with said clutch, the movement of said measuring screw being thus limited.

3. In a micrometer having a measuring screw and an allowance-part adjustable by a shutter, a clutch provided with a lug and a notch, a latch engaging said lug, so as to prevent said clutch from making a complete revolution, whereby the measuring screw is locked together with said clutch, the movement of said measuring screw being thus limited, a movable shutter being provided for partly covering the marks of the fine scale.

4. In a micrometer having a measuring screw and an allowance-part adjustable by a shutter, a clutch provided with a lug and a notch, a latch for engaging said lug, so as to prevent said clutch from making a complete revolution, whereby the measuring screw is locked together with said clutch, the movement of said measuring screw being thus limited, two movable shutters being provided for partly covering the marks of the fine scale.

5. In a micrometer having a measuring screw and an allowance-part adjustable by a shutter, a clutch provided with a lug and a notch, a latch in the path of said lug, so as to prevent said clutch from making a complete revolution, whereby the measuring screw is locked together with said clutch, the movement of said measuring screw being thus limited, two movable shutters being provided for partly covering the marks of the fine scale, said shutters being provided with scales allowing to read directly how much the measure taken differs from the limits allowed.

6. In a micrometer of the type described, the combination with the graduated sleeve thereof, of two shutters rotatably adjustable about said sleeve relatively to one another, the space between the opposed edges of the two shutters exposing graduations on said sleeve equal to the tolerance and covering the remaining graduations.

7. In a micrometer of the type described, the combination with the graduated sleeve thereof, of two shutters rotatably adjustable about said sleeve relatively to one another, the space between the opposed edges of said shutters exposing graduations on said sleeve equal to the tolerance and covering the remaining graduations, said shutters having separate graduations starting from said edges.

8. In a micrometer of the type described, the combination with the graduated sleeve thereof, of two shutters rotatably adjustable about said sleeve relatively to one another, the space between the opposed edges of said shutters exposing graduations on said sleeve equal to the tolerance and covering the remaining graduations, said shutters having separate graduations starting from said edges, and mechanism for preventing a full rotation of said sleeve.

9. In a micrometer of the type described, the combination with the graduated sleeve thereof, of two cylindrical graduated shutters thereon for covering the graduations that do not represent the tolerance and a nut for locking said shutters in their adjusted positions.

10. In a micrometer of the type described, the combination with the graduated sleeve thereof, of two cylindrical graduated shutters thereon for covering the graduations that do not represent the tolerance, said shutters being provided with graduations on their operative edges, and a nut for locking said shutters in their adjusted positions.

11. In a micrometer of the type described, the combination with the measuring screw; of a split clutch ring having a lug and a notch, a rotatable clamping ring about said sleeve and a clutching member between them, and a movable latch arranged to enter said notch and hold the clutch ring during the clamping thereof to said measuring screw, said latch when withdrawn from said notch remaining in the path of said lug.

In testimony that I claim the foregoing as my invention I have signed my name.

ALFRED ZIMMERMANN.

Copies of this patent may be obtained for five cents each, by addressing the "Commissioner of Patents, Washington, D. C."